US006845439B1

(12) United States Patent
Young

(10) Patent No.: US 6,845,439 B1
(45) Date of Patent: Jan. 18, 2005

(54) METHOD AND SYSTEM FOR ACCESSING AN EXPANDED SCB ARRAY

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 503 days.

(21) Appl. No.: 09/872,830

(22) Filed: May 31, 2001

(51) Int. Cl.$^7$ .......................... G06F 12/00; G06F 12/08; G06F 3/00
(52) U.S. Cl. ....................... 711/209; 711/206; 711/220; 710/3; 710/9
(58) Field of Search ................................ 710/2, 3, 8, 9, 710/300, 107, 112; 711/205, 206, 209, 220

(56) References Cited

U.S. PATENT DOCUMENTS

| | | | | |
|---|---|---|---|---|
| 4,374,417 A | * | 2/1983 | Bradley et al. | 711/202 |
| 4,805,097 A | * | 2/1989 | De Sanna | 711/206 |
| 5,659,690 A | * | 8/1997 | Stuber et al. | 710/307 |
| 6,373,737 B1 | * | 4/2002 | Lysinger | 365/49 |
| 6,434,685 B1 | * | 8/2002 | Sexton et al. | 711/206 |

OTHER PUBLICATIONS

"content addressable memory": in The Free On–Line Dictionary of Computing, [online Feb. 16, 1995], [retrieved Dec. 4, 2003]. Retrieved from the Internet <URL: http://foldoc.doc.ic.ac.uk/foldoc/foldoc.cgi?content+addressable+memory>.*
"Memory Management Unit": in The Free On–Line Dictionary of Computing, [online May 24, 1999], [retrieved Dec. 4, 2003]. Retrieved from the Internet <URL: http://foldoc.doc.ic.ac.uk/foldoc/foldoc.cgi?memory+management+unit>.*
"paging": in The Free On–Line Dictionary of Computing, [online Nov. 22, 1996], [retrieved Dec. 2, 2003]. Retrieved from the Internet <URL: http://foldoc.doc.ic.ac.uk/foldoc/foldoc.cgi?paging>.*
"pointer": in The Free On–Line Dictionary of Computing, [online Jul. 7, 1999], [retrieved Dec. 2, 2003]. Retrieved from the Internet <URL: http://foldoc.doc.ic.ac.uk/foldoc/foldoc.cgi?query=pointer>.*
"content addressable memory": in The Free On–Line Dictionary of Computing, [online Feb. 16, 1995], [retrieved Dec. 4, 2003]. Retrieved from the Internet <URL:http://foldoc.doc.ic.ac.uk/foldoc/foldoc.cgi?content+addressable+memory>.*
"Memory Management Unit": in The Free On–Line Dictionary of Computing, [online May 24, 1999], [retrieved Dec. 4, 2003]. Retrieved from the Internet <URL: http://foldoc.doc.ic.ac.uk/foldoc/foldoc.cgi?memory+management+unit>.*
"paging": in The Free On–Line Dictionary of Computing, [online Nov. 22, 1996], [retrieved Dec. 2, 2003]. Retrieved from the Internet <URL: http://foldoc.doc.ic.ac.uk/foldoc/foldoc.cgi?paging>.*
"pointer": in The Free On–Line Dictionary of Computing, [online Jul. 7, 1999], [retrieved Dec. 2, 2003]. Retrieved from the Internet <URL: http://foldoc.doc.ic.ac.uk/foldoc/foldoc.cgi?query=pointer>.*

* cited by examiner

Primary Examiner—Mark H. Rinehart
Assistant Examiner—Thomas J. Cleary
(74) Attorney, Agent, or Firm—Gunnison, McKay & Hodgson, L.L.P.; Forrest Gunnison

(57) ABSTRACT

A method for accessing hardware I/O control blocks, which are stored in an hardware I/O control block array, by a parallel SCSI host adapter addresses one page in a plurality of pages of the hardware I/O control block array for the parallel SCSI host adapter using a first portion of a hardware I/O control block array pointer in the parallel SCSI host adapter. The one page includes a plurality of storage sites for hardware I/O control blocks. A hardware I/O control block stored in the one page is addressed using a second portion of the hardware I/O control block array pointer in the parallel SCSI host adapter. Addressing the hardware I/O control block stored in the one page includes using a tag supplied by a reconnecting SCSI target as the second portion.

19 Claims, 7 Drawing Sheets

METHOD AND SYSTEM FOR ACCESSING AN EXPANDED SCB ARRAY

BACKGROUND OF THE INVENTION

1. Field of the Invention

The present invention relates generally to SCSI host adapters, and in particular to accessing an expanded SCB array associated with a SCSI host adapter.

2. Description of Related Art

Prior art parallel SCSI host adapters have utilized a hardware I/O control block array to store hardware I/O control blocks, e.g., a sequencer control block (SCB) array to store SCBs. A driver executing on a host system constructed each SCB. The driver constructed the SCB and placed all the information in the SCB that was required by the host adapter to deliver a command to a SCSI target and to execute that command.

The SCB included a storage site location in the SCB array for the SCB. When the storage site location was loaded in a SCB array pointer register in the host adapter, the storage site for the SCB in the SCB array was addressed. The SCB also included a command block (CDB) that was delivered by the host adapter to the SCSI target. See for example, commonly assigned U.S. Pat. No. 5,659,690 entitled "Programmably Configurable Host Adapter Integrated Circuit including a RISC Processor," of Craig A. Stuber et al. issued on Aug. 19, 1997, which is incorporated wherein by reference in its entirety. See also, commonly assigned U.S. Pat. No. 5,625,800 entitled "A Sequence Control Block Array External To A Host Adapter Integrated Circuit" of Michael D. Brayton et al. issued on Apr. 29, 1997, and U.S. Pat. No. 5,564,023 entitled "Method for Accessing A Sequencer Control Block By A Host Adapter Integrated Circuit" of B. Arlen Young issued on Oct. 8, 1996, each of which is incorporated herein by reference in its entirety.

Upon construction of the SCB by the driver, the SCB was transferred from the host system to the host adapter various techniques for transferring SCBs from a host system to a host adapter are known.

The prior art SCB array had 255 storage sites available. In particular, one byte was available for specifying an address of a storage location for a SCB within the SCB array. This limited the total number of storage sites to 256, but one storage address was required for an invalid address, and consequently only 255 storage sites in the SCB array had valid addresses.

For tagged queuing, the tag delivered to a tagged queuing SCSI target had a value equal to the number of the SCB array site containing the SCB for that SCSI target. At any given time, there can be a large number of SCBs in the SCB array for which commands have been delivered to the tagged queuing SCSI target.

When the tagged queuing SCSI target reconnected to the host adapter, the tagged queuing SCSI target returned the tag to identify the SCB that contained the command for which the target was reconnecting. The host adapter sequencer and/or hardware circuits used the tag, without modification, to identify the corresponding SCB in the SCB array. In particular, upon receiving the tag from the reconnecting target, the tag was simply loaded into the host adapter SCB array pointer register to access the appropriate SCB.

Unfortunately, the tag used in SCSI tagged queuing is limited to one byte in size except for Packetized SCSI. As SCSI command queue depths become greater in SCSI disk drives, and the SCSI disk drives do a better job of sorting commands within their queues, performance could be improved by delivering more commands to the disk drives. Also, a SCSI protocol enhancement, called Extended Addressing, enables the quadrupling of the number of SCSI targets on a single SCSI bus from 15 to 63.

The one byte limitation on the tag used in SCSI tagged queuing for non-Packetized SCSI limits the use of greater command depth, because the one byte tag size limits the number of SCB storage locations that can be addressed using only the tag returned by a reconnecting SCSI target. Hence, the ability to address only 255 storage sites will become a limiting factor in SCSI performance for non-Packetized SCSI operations.

SUMMARY OF THE INVENTION

A paged hardware I/O command block array in a SCSI host adapter system alleviates the problems with the prior art array. In particular, with a paged hardware I/O command block array, all SCSI target addresses can be supported at the same time. There is no restriction on how a SCSI bus is populated with target devices. A maximum number of commands can be queued for any of the SCSI target devices. No portion of the paged array of this invention is allocated to a particular SCSI target to the exclusion of other SCSI target devices.

In one embodiment, no special hardware assistance is required to access a hardware I/O control block by a reconnecting target-device. An on-chip processor of the parallel SCSI host adapter performs a search for the appropriate hardware I/O control block in the paged hardware I/O command block array. In addition, no lookup tables are required by the on-chip processor to convert a tag from the reconnecting target device to a storage site for the corresponding hardware I/O command block in the paged hardware I/O command block array. Finally, very little time is required by the on-chip processor to locate the storage site using the tag.

In one embodiment of the present invention, a method for accessing hardware I/O control blocks, which are stored in an hardware I/O control block array, by a parallel SCSI host adapter addresses one page in a plurality of pages of the hardware I/O control block array for the parallel SCSI host adapter using a first portion of a hardware I/O control block array pointer in the parallel SCSI host adapter. The one page includes a plurality of storage sites for hardware I/O control blocks. A hardware I/O control block stored in the one page is addressed using a second portion of the hardware I/O control block array pointer in the parallel SCSI host adapter. Addressing the hardware I/O control block stored in the one page includes using a tag supplied by a reconnecting SCSI target as the second portion.

In this method, a reconnecting target address is stored by the parallel SCSI host adapter. The parallel SCSI host adapter then compares a target address stored in the hardware I/O control block with the reconnecting target address. The parallel SCSI host adapter uses the hardware I/O control block upon the target address stored in the hardware I/O control block and the reconnecting target address being equal.

However, if the target address stored in the hardware I/O control block and the reconnecting target address are not equal, the parallel SCSI host adapter changes the first portion of the hardware I/O control block array pointer. The host adapter addresses another page in the plurality of pages of the hardware I/O control block array using the first portion of the hardware r/o control block array pointer in the parallel SCSI host adapter. The another page also includes a plurality of storage sites for hardware I/O control blocks.

The parallel SCSI host adapter addresses a hardware I/O control block stored in the another page using the second portion of the hardware I/O control block array pointer in the parallel SCSI host adapter. Again, the parallel SCSI host adapter compares a target address stored in the hardware I/O control block stored in the another page with the reconnecting target address. The host adapter uses the hardware I/O control block stored in the another page upon the target address stored in the hardware I/O control block stored in the another page and the reconnecting target address being equal.

Hence, a method for accessing hardware I/O control blocks, which are stored in a hardware I/O control block array, by a parallel SCSI host adapter, includes storing hardware I/O control blocks for targets on a SCSI bus in a paged hardware I/O control block array. One hardware I/O control block in the paged hardware I/O control block array is addressed, i.e., accessed, by a hardware. I/O control block array pointer. The hardware I/O control block-array pointer includes a page identifier and a storage site identifier.

The page identifier is configured to identify a page in the paged hardware I/O control block array so that the paged hardware I/O control block array pointer addresses one hardware I/O control block page in the array. A tag from a reconnecting target is loaded into the storage site identifier of the paged hardware I/O control block array pointer.

In one embodiment of the present invention, a system includes a parallel SCSI host adapter that in turn includes a sequence and a paged hardware I/O control block array pointer coupled to the sequencer. The system also includes a memory coupled to the paged hardware I/O control block array pointer, and including a paged hardware I/O control block array. The paged hardware I/O control block array includes a plurality of pages going from a lowest page to a highest page. Each of the plurality of pages further includes a plurality of hardware I/O control block storage sites. A number of the hardware I/O control block storage sites in the plurality of control block storage sites on at least one of the plurality of pages is equal to a number of unique tag values that can be returned by a tagged queue SCSI target reconnecting to the parallel SCSI host adapter. In one embodiment, the memory is external to the parallel SCSI host adapter and in another embodiment, the memory is internal to the parallel SCSI host adapter.

In yet another embodiment of this invention, a memory includes:
   an expanded SCSI control block array for a parallel SCSI host adapter, the expanded SCSI control block array comprising:
   a plurality of pages going from a lowest page to a highest page, wherein each page further comprises:
       a plurality of SCSI control block storage sites,
       wherein a number of SCSI control block storage sites in the plurality of SCSI control block storage sites on at least one of the plurality of pages is equal to a number of unique tag values that can be returned by a tagged queue SCSI target reconnecting to the parallel SCSI host adapter.

BRIEF DESCRIPTION OF THE DRAWINGS

In the drawings and the following detailed description, elements with the same reference numeral are the same element. Also, the first digit of a reference numeral for an element indicates the first drawing in which that element appeared.

DETAILED DESCRIPTION

Figure 1:
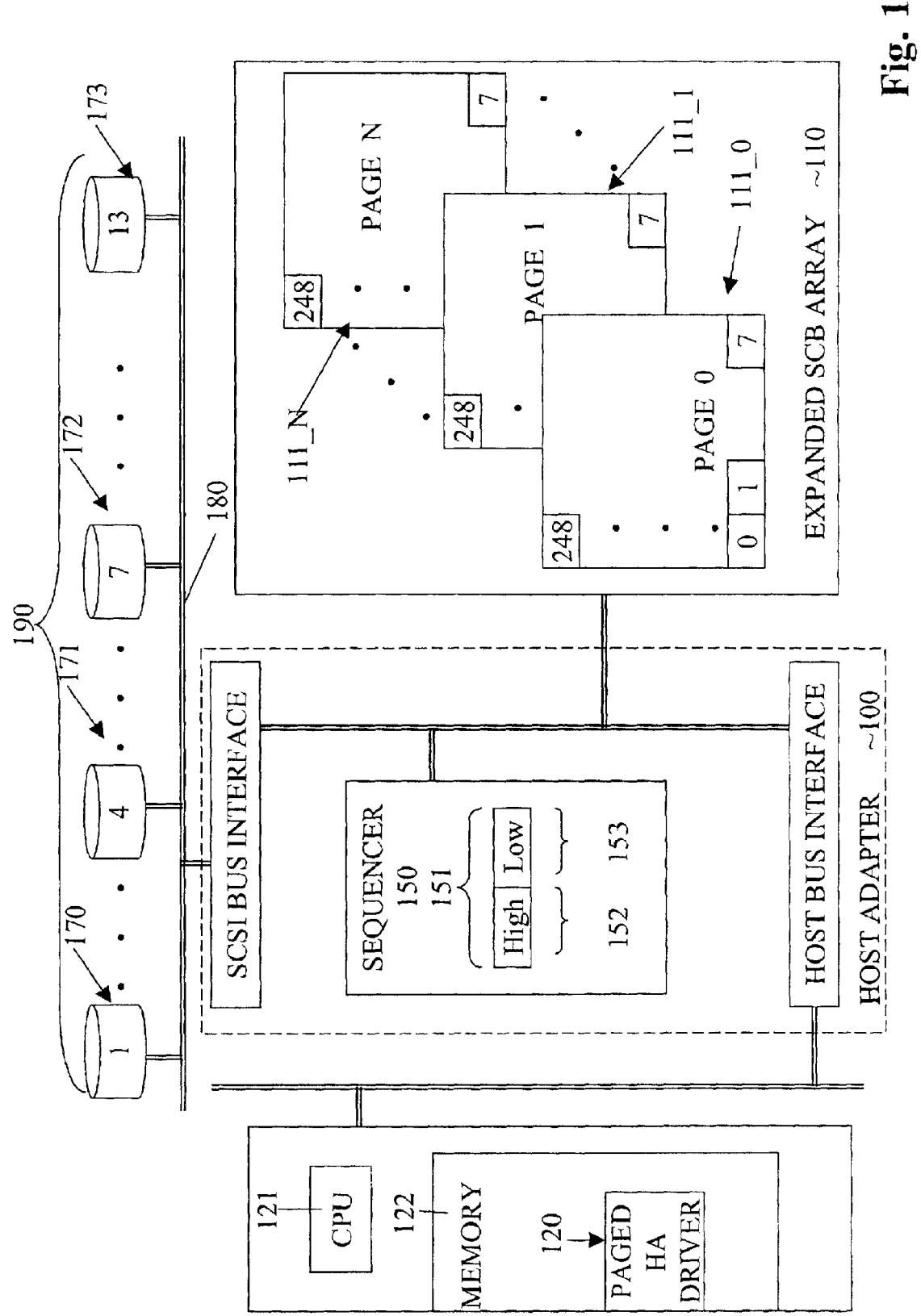
FIG. 1 is a block diagram that includes a paged hardware I/O control block array according to one embodiment of the present invention.
Figure 2:
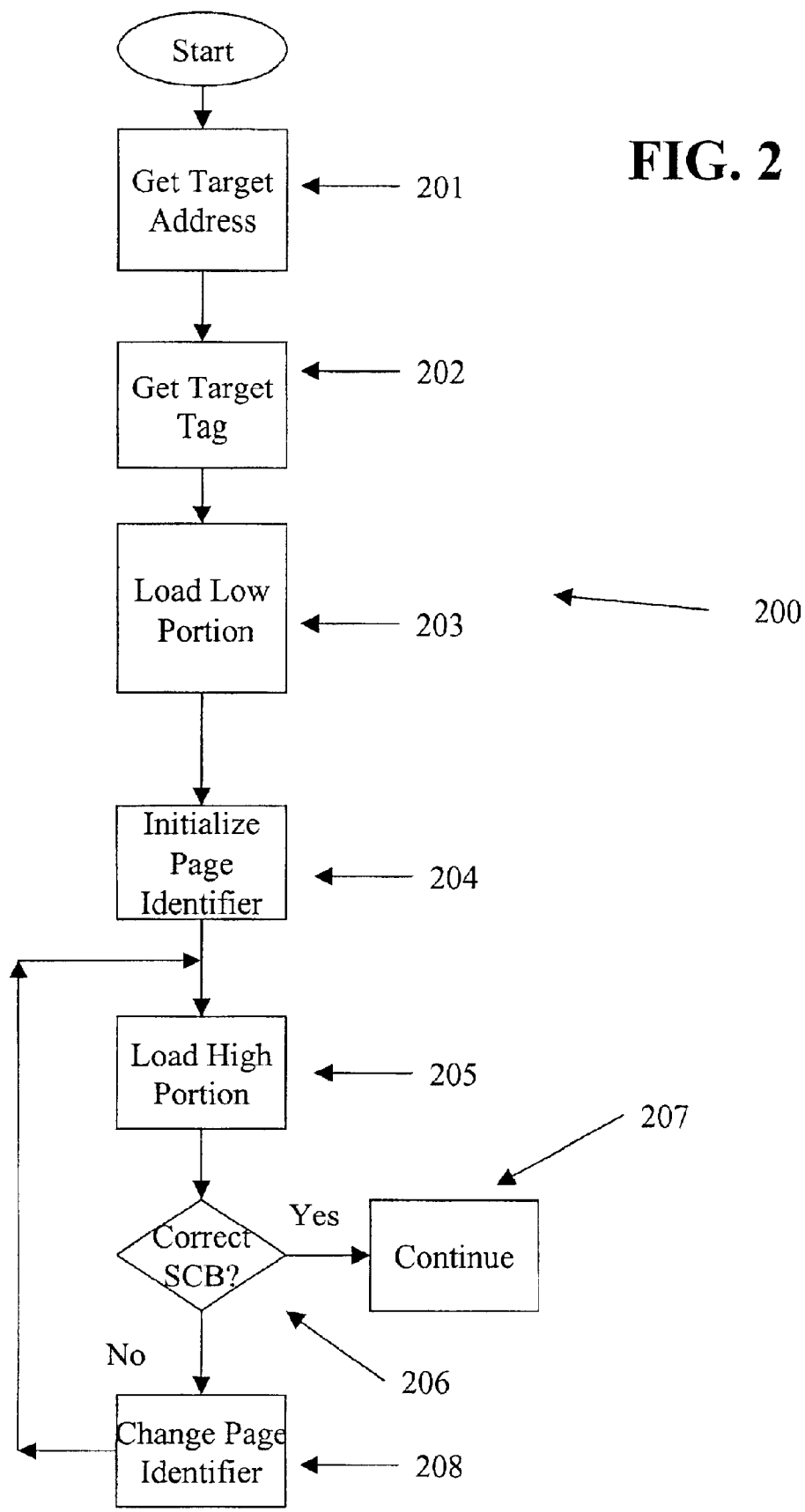
FIG. 2 is a process flow diagram for selecting one storage site in the paged hardware I/O control block array of FIG. 1 upon reconnection by a SCSI target device according to one embodiment of the present invention.

According to the principles of this invention, a size of an expanded SCB array 110 for a parallel SCSI host adapter 100 is increased so that the size of expanded SCB array 110 no longer limits the number of commands that can be queued to 255 commands. Herein, a SCB is an example of a hardware I/O control block. In this embodiment, expanded SCB array 110 is a memory array that is partitioned into a plurality of pages 111_0 to 111_N. Each page, in one embodiment, includes a number of storage sites equal to a maximum number of commands that can be stored for a target on SCSI bus 180.

In general, each page in plurality of pages 111_0 to 111_N includes a plurality of SCB storage sites. In one embodiment, the size of the tag returned by a tagged queuing SCSI target, e.g., SCSI target 170, determines the number of storage sites on a page. Consequently, unlike the prior art, the maximum number of commands that can be queued for a tagged queuing SCSI target is no longer limited by the tag size.

For the current SCSI tagged queuing, the tag is one byte, and so each of plurality of pages 111_0 to 111_N has two hundred fifty-six storage sites. However, on page 111_N, only two hundred fifty-five sites are used. The last site on the last page is reserved for use as an invalid pointer.

If the size of the tag should be increased, the principles of this invention are still directly applicable, i.e., the principles of this invention can be implemented for the Packetized SCSI protocol that uses a two-byte tag. Accordingly, the reference to a particular number of pages in expanded SCB array 110 and the reference to a particular number of storage sites on a page in expanded SCB array 110 are illustrative only and are not intended to limit the invention to the particular numbers used herein.

According to the principles of this invention, tag values for a given target must be unique, i.e., two SCBs with the same tag value cannot be queued for a given target 170 in expanded SCB array 110. As explained more completely below, a tag value is an identifier for a storage site on a page of array 110. However, SCBs having the same tag value can be queued for different targets in expanded SCB array 110. Similarly, two or more SCBs for a given target can be stored in expanded SCB array 110 so long as each SCB for the given target has a unique tag value.

Method 200 is used by host adapter 100 to find the SCB in expanded SCB array 110 for a reconnecting tagged queuing SCSI target 170 in a plurality of SCSI targets 190. The operations included in method 200 are only those necessary for understanding the present invention. Those of skill in the art will appreciate that, in one embodiment, at least a portion of method 200 is included within firmware executed by the host adapter processor which in this example is a RISC sequencer 150. The parts of method 200 included in the firmware depend on whether parts of method 200 are performed by automated hardware in host adapter 100. The particular combination of firmware and hardware used to implement method 200 is not essential to this invention, and typically depends on performance and cost requirements.

Upon start of method 200, get target address operation 201 is performed by host adapter 100 in SCSI phase RESELECTION for reconnecting target 170. Reconnecting target 170 provides an address sometimes referred to as identification (ID) of target 170 in SCSI phase RESELECTION, which is referred to as the reconnecting target address. Host adapter 100 stores the reconnecting target address. Upon receipt and storage of the reconnecting target address operation 201 transfers to get target tag operation 202.

In get target tag operation 202, host adapter 100 receives the tag for which target 170 is reconnecting in SCSI phase MESSAGE IN for non-Packetized SCSI Protocol. As is known to those of skill in the art, for the Packetized SCSI Protocol, the tag is received in a L_Q information packet during a data phase. Upon receipt of the tag, get target tag operation 202 is complete and processing transfers to load low portion operation 203.

In load low portion operation 203, the tag is loaded into low portion 153 of SCB array pointer 151. Low portion 153 is sometimes referred to as a storage site identifier. In one embodiment, sequencer 150 loads the tag into low portion 153, and in another embodiment, the tag is automatically loaded by host adapter hardware into low portion 153. Load low portion operation 203 transfers processing to initialize page identifier operation 204.

Initialize page identifier operation 204 initializes a page identifier to a predetermined value, which in one embodiment is the page number of the low page of expanded SCB array 110. Operation 204 transfers to load high portion operation 205 that in turn loads the page identifier into high portion 152 of SCB array pointer 151. High portion 152 is sometimes called page identifier 152. SCB array pointer 151 is an example of a paged hardware I/O control block array pointer. Load high portion operation 205 transfers to correct SCB check operation 206.

In correct SCB check operation 206, host adapter 100 reads the stored target address from the SCB addressed by SCB array pointer 151 and compares the stored target address with the stored reconnecting target address. If the two addresses are the same, the SCB addressed by SCB array pointer 151 is the SCB for the reconnecting tagged queue target 170, and check operation 20.6 transfers to continue operation 207.

However, if the two addresses are not the same, the SCB addressed by SCB array pointer 151 is not the SCB for the reconnecting tagged queue target 170, and check operation 206 transfers to change page identifier operation 208.

In change page identifier operation 208, the value of the page identifier in high portion 152 is changed. If the page identifier was initialized to low page 111_0 in operation 204, the page identifier is incremented. Conversely, if the page identifier was initialized to high page 111_N in operation 204, the page identifier is decremented. Operation 208 transfers to load high pointer operation 205 that in turn loads the new page identifier in high portion 152 of SCB array pointer 151. Operations 208, 205, and 206 are repeated until the correct SCB for the reconnecting target is found in check operation 206.

Operations 204, 205, and 208 are illustrative only and are not intended to limit the invention to the particular embodiment described. For example, if high portion 152 of SCB array pointer 151 is implemented as a counter, initially, operations 204 and 205 are resetting the counter to either a minimum or a maximum value. If the addresses do not match in check operation 206, operations 208 and 205 are changing the value of the counter. Since the counter is high portion 152 of SCB array pointer 151, there is no need to load the value into high portion 152 in this embodiment.

Figure 3:
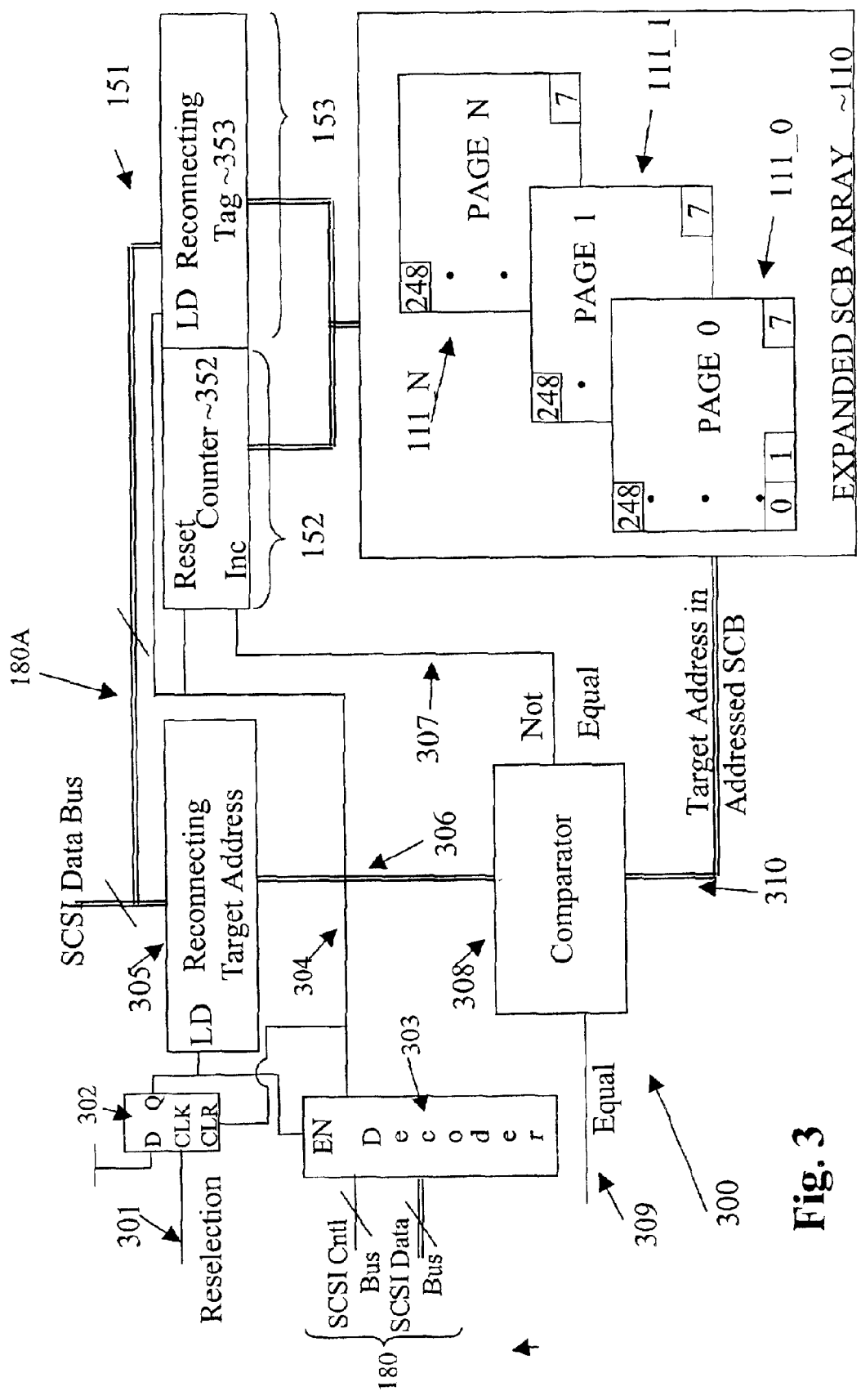
FIG. 3 is an illustration of one embodiment of a circuit for implementing the process of FIG. 2.

For example, FIG. 3 is a high-level block diagram of one embodiment of a circuit configuration 300 in host adapter 100 that implements method 200. Alternatively, method 200 is implemented by instructions executed by sequencer 150. While expanded SCB array 110 is illustrated as being external to host adapter 100 in FIG. 1, this is illustrative only and is not intended to limit the invention to this embodiment. SCB array 100 also may be internal to host adapter 100.

When a SCSI phase RESELECTION for reconnecting target 172, for example, is indicated on SCSI bus 180, an active signal is driven on line 301 to a clock terminal CLK of register 302. In response to the signal going active on terminal CLK, register 302 drives an active signal on output terminal Q, which in turn results in an active signal (i) on a load terminal LD of reconnecting target address register 305 that in turn loads register 305, and (ii) on an enable terminal EN of decoder circuit 303 that in turn enables circuit 303.

Thus, the signal going active on line 301 results in the loading of the target ID on SCSI data bus 180A into reconnecting target address register 305 that is also connected to a first input of a comparator 308 by bus 306. Hence, get target operation 201 is performed and the reconnecting target ID is stored in register 305.

After being enabled, decoder 303 determines when the tag is available on SCSI bus 180 and generates an active signal on line 304 at the appropriate time. Prior art host adapters included circuitry to capture the tag on SCSI bus 180 for both non-Packetized and Packetized SCSI Protocols. Accordingly, this circuitry is modified to be responsive to the enable signal and to provide the signal on line 304 to create decoder 303.

The active signal on line 304 is applied to a reset terminal of a counter 352 that is high portion 152 of SCB array pointer 151, and to a load terminal of a register 353 that is low portion 153 of SCB array pointer 151. In response to the rising edge on the load terminal, the tag on SCSI bus 180 is loaded into low portion 153 of SCB array pointer 151, and so operations 202 and 203 are complete. The active signal on line 304 also is applied to a clear terminal of register 302, with a delay if necessary, so that the circuitry is ready for the next target reselection.

The active signal on the reset terminal of counter 352 resets counter 352, which initializes the page identifier. Thus, initialize page identifier operation 204 also is completed. In this example, when counter 352 is initialized, high portion 152 of SCB array pointer 151 is loaded and so operation 205 also is completed.

The output signals from register 353 and counter 352 are used to address the SCB at the SCB array site specified by the value in register 353 on page zero 111_0 in extended SCB array 110. The SCSI target address stored in the addressed SCB in page zero 111_0 is a first input signal to comparator 308 via bus 310, and a second input signal to comparator 308 is the reconnecting target address in register 305 via bus 306.

If the two input SCSI target addresses are equal, comparator 308 drives an active signal on a first output line 309, and otherwise an active signal on a second output line 307. Hence, comparator 308 performs correct SCB check operation 206.

If the addresses are not equal, counter 352 is incremented by the active signal on line 307. The incrementing of counter 352 is effectively operations 208 and 205. Hence, circuit 300 performs method 200 of this invention.

Figure 4A:
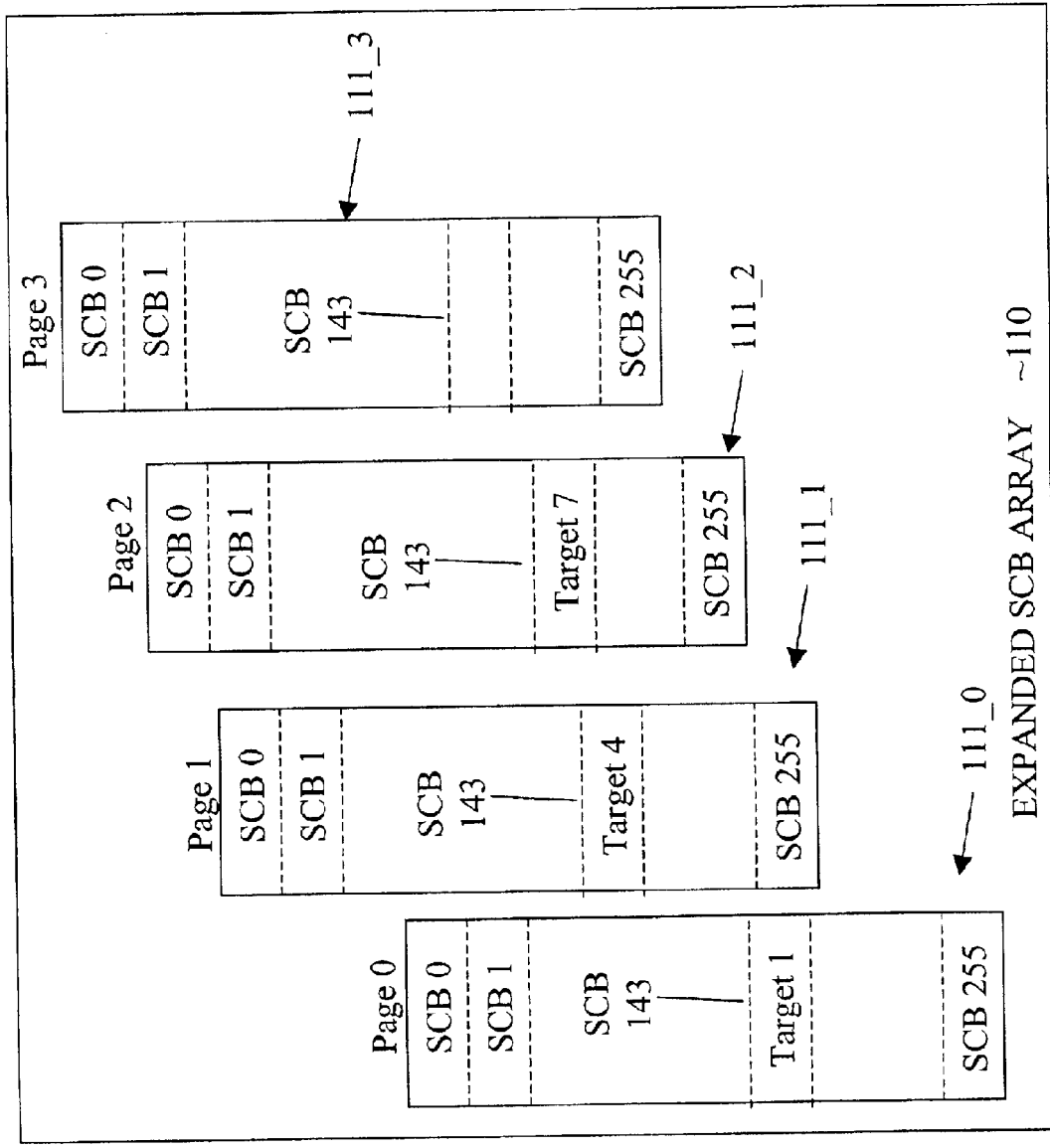
FIGS. 4A to 4D illustrate alternative approaches for using the paged hardware I/O control block array of FIG. 1.

An important aspect of this invention is the reallocation of SCB storage sites in extended SCB array 110 by paged host adapter driver 120, which is stored in memory 122 (FIG. 1), and which executes on CPU 121. As an example, assume that paged host adapter driver 120 has allocated three SCBs with the same tag, e.g., a tag of 8Fh (FIG. 4A), to page zero 111_0 for target one 170, to page one 111_1 for target four 171, and to page two 111_2 for target seven 172. Note that in FIG. 4A the decimal value of the tag, e.g., 143, is used.

Hence, in this example, each of SCB sites 143 in pages 111_0 to 111_2 contains an SCB for the target indicated. Assume that the SCB for target 4 completes execution first, and so SCB storage site 8Fh on page one 111_1 is available for use. This is indicated in FIG. 4B by adding Done to the site, which indicates that the site still contains a valid SCB, but so far as paged host adapter driver 120 is concerned the storage site is available for use.

Hence, when another SCB storage site is needed, paged host adapter driver 120 could use site 8fh on page three 111_3 so long as the target specified by the SCB was not any one of target one 170 and target seven 172.

Figure 4B:
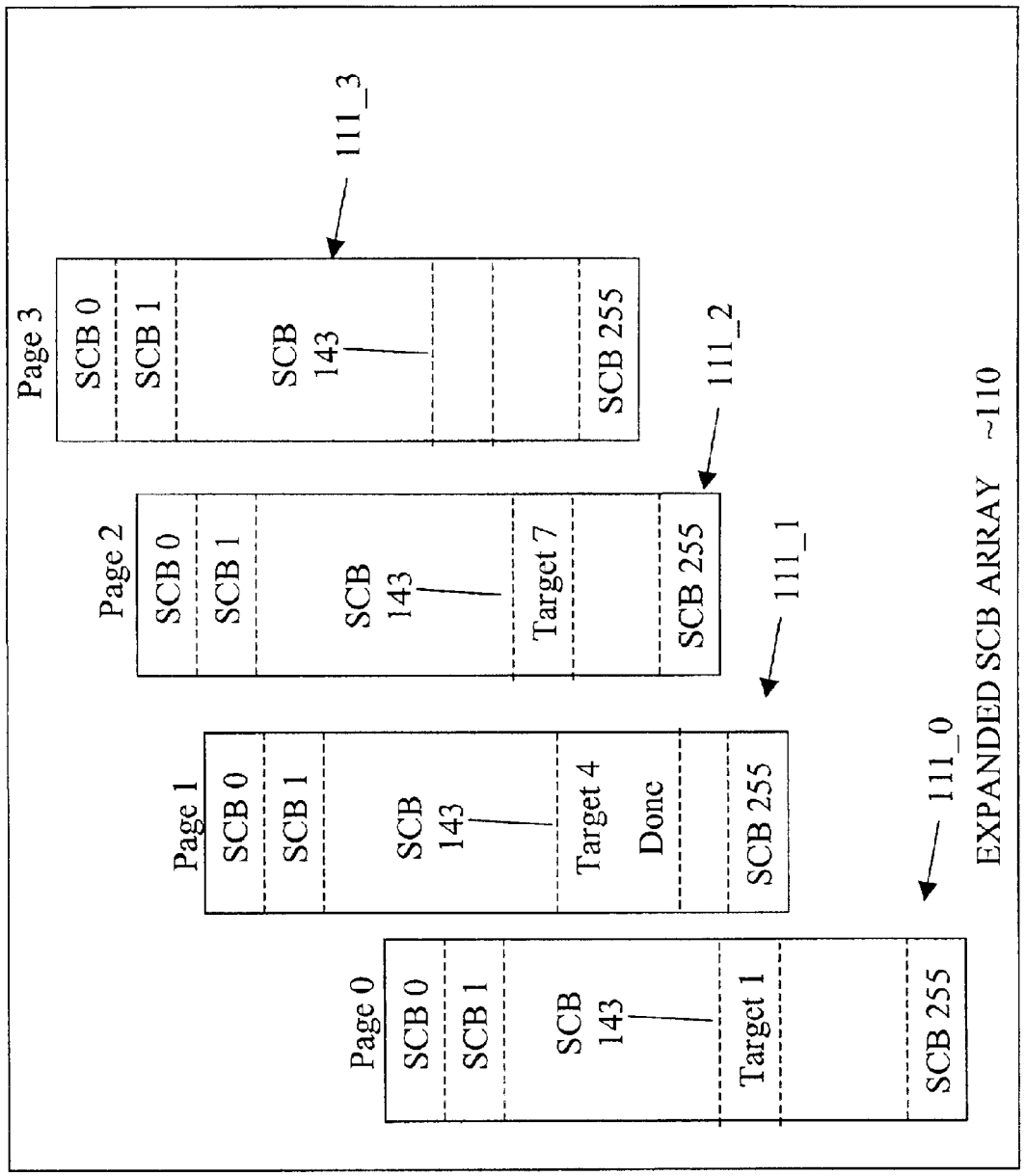
Figure 4C:
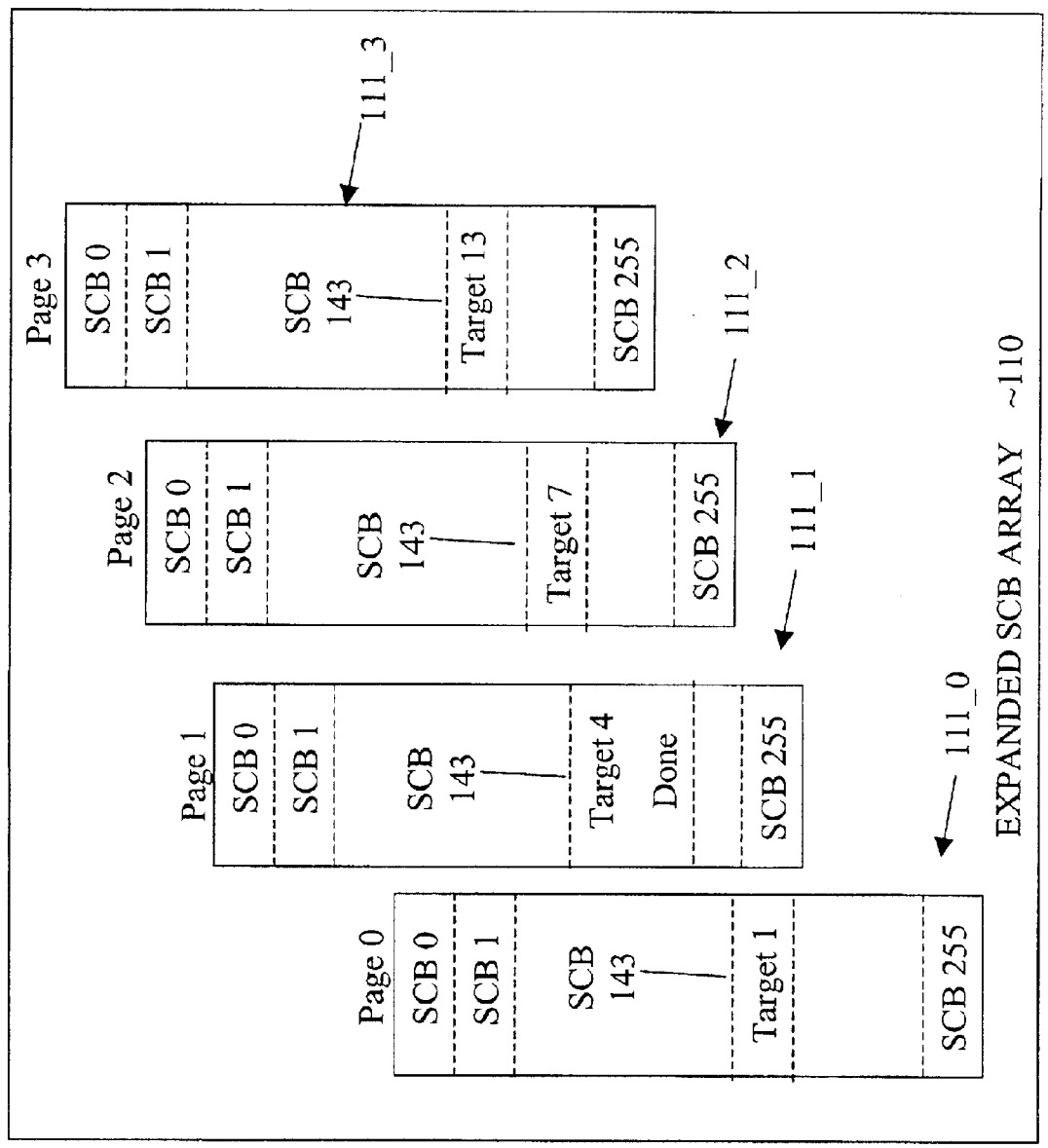

As an example, assume that the new SCB is for target thirteen 173 and so paged host adapter driver 120 allocates site 8Fh on page three 111_3 and the SCB is loaded into that site (FIG. 4C). When target thirteen 173 reconnects, host adapter 100, using method 200, first addresses site 8Fh on page zero 111_0, and compares the target addresses. Since there is not a match, the page is incremented to page one 111_1, and the target addresses compared again. Since there is not a match, these operations are repeated until page three 111_3 is reached and there is a match. Hence, method 200 works when other than the first available SCB site is allocated for a new SCB. However, note that better performance would have been obtained, if driver 120 had used site 8Fh on page one 111_1.

Figure 4D:
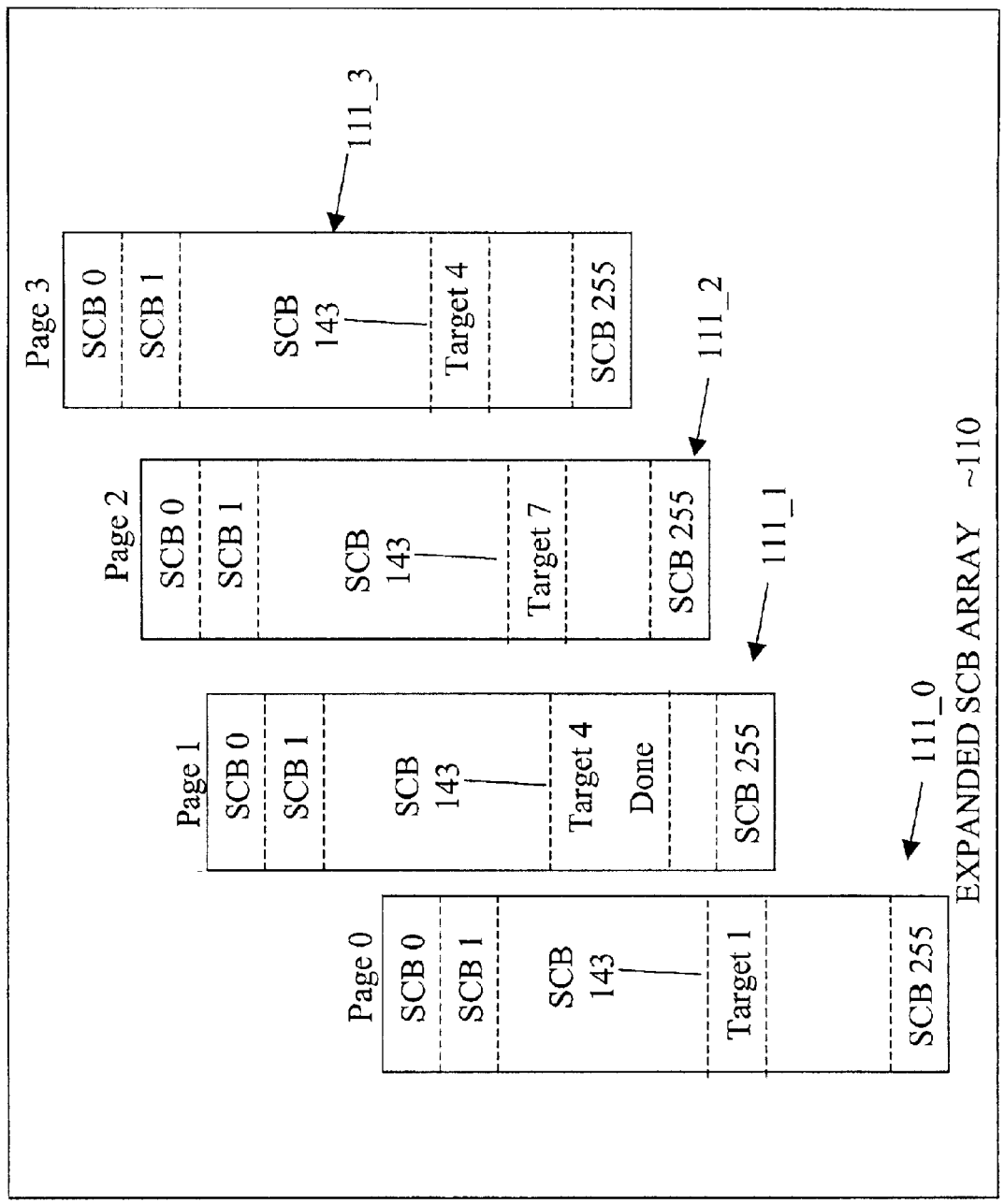

However, assume that after the SCB for target four 171 was completed as illustrated in FIG. 4B, the new SCB was not for target thirteen 173 and instead was for target four 171 and driver 120 used site 8Fh on page three 111_3 instead of site 8Fh on page one 111_1 as illustrated in FIG. 4D. In this case, when target four 171 reconnects, host adapter 100, using method 200, first addresses site 8Fh on page zero 111_0, and compares the target addresses. Since there is not a match, the page is incremented to page one 111_1, and the target addresses compared again. This time there is a match with the relic SCB stored on page one 111_1. Hence, host adapter 100 would use the relic SCB on page one 111_1 instead of the correct SCB on page three 111_3. To avoid this error, paged host adapter driver 120 must always re-allocate the first available SCB array storage site within the lowest page number. This assures that the correct SCB is always addressed for a reconnecting target and that the time to scan across pages for the SCB is minimized.

In one embodiment, paged host adapter driver 120 maintains a list of available storage sites for each page of expanded SCB array 110. Paged host adapter driver 120 selects the first available site on the first page and then determines if for the specified target the first available site is unique. In one embodiment, paged host adapter driver 120 includes a list that contains the sites used by a particular target. If the first available site is not included in the list driver 120 uses that site. In particular, driver 120 loads a page number and a storage site into a SCB that is subsequently transferred by host adapter 100 to the appropriate location in array 110. The particular method used by driver 120 to manage selection of storage sites in array 110 is not essential to this invention so long as driver 120 selects the first available unique site for a particular target.

With expanded SCB array 110, all SCSI target addresses can be supported at the same time. There is no restriction on how SCSI bus 180 is populated with target devices. No portion of array 110 is allocated to a particular SCSI target to the exclusion of other SCSI target devices. No special hardware assistance is required to access a SCB by a reconnecting target device. Sequencer 150 performs the search. In addition, no lookup tables are required to convert the tag from the reconnecting target device to a storage site for the corresponding SCB. Finally, very little time is required to locate the storage site using the tag as described above.

The embodiments of the present invention described herein are illustrative only, and are not intended to limit the invention to the particular embodiments. Hence, in view of this disclosure, those of skill in the art can implement a SCSI host adapter system with a paged hardware I/O control block array in a wide variety of configurations and in a wide variety of SCSI initiators.

I claim:

1. A method for accessing hardware I/O control blocks, which are stored in an hardware I/O control block array, by a parallel SCSI host adapter, said method comprising:

addressing one page in a plurality of pages of said hardware I/O control block array for said parallel SCSI host adapter using a first portion of a hardware I/O control block array pointer in said parallel SCSI host adapter wherein said one page includes a plurality of storage sites for hardware I/O control blocks; and addressing a hardware I/O control block stored in said one page using a second portion of said hardware I/O control block array pointer in said parallel SCSI host adapter.

2. The method of claim 1 wherein said addressing a hardware I/O control block stored in said one page further comprises:

using a tag supplied by a reconnecting SCSI target as said second portion.

3. The method of claim 1 further comprising:

storing a reconnecting target address by said parallel SCSI host adapter.

4. The method of claim 3 further comprising:

comparing a target address stored in said hardware I/O control block with said reconnecting target address.

5. The method of claim 4 further comprising:

using said hardware I/O control block upon said target address and said reconnecting target address being equal.

6. The method of claim 4 further comprising:

changing said first portion of said hardware I/O control block array pointer upon said target address and said reconnecting target address being unequal.

7. The method of claim 6 further comprising:

addressing another page in said plurality of pages of said hardware I/O control block array for said parallel SCSI host adapter using said first portion of said hardware I/O control block array pointer in said parallel SCSI host adapter wherein said another page includes a plurality of storage sites for hardware I/O control blocks.

8. The method of claim 7 further comprising:

addressing a hardware I/O control block stored in said another page using said second portion of said hardware I/O control block array pointer in said parallel SCSI host adapter.

9. The method of claim 8 further comprising:

comparing a target address stored in said hardware I/O control block stored in said another page with said reconnecting target address.

10. The method of claim 9 further comprising:

using said hardware I/O control block stored in said another page upon said target address stored in said hardware I/O control block stored in said another page and said reconnecting target address being equal.

11. A method for accessing hardware I/O control blocks, which are stored in a hardware I/O control block array, by a parallel SCSI host adapter, said method comprising:

storing hardware I/O control blocks for targets on a SCSI bus in a paged hardware I/O control block array; and accessing one hardware I/O control block in said paged hardware I/O control block array addressed by a hardware I/O control block array pointer, wherein said hardware I/O control block array pointer includes a page identifier and a storage site identifier.

12. The method of claim 11 wherein a first portion of said paged hardware I/O control block array pointer includes a page identifier, and said method further comprises:

configuring said page identifier to identify a page in said paged hardware I/O control block array so that said paged hardware I/O control block array pointer addresses one hardware I/O control block page in said array.

13. The method of claim 12 further comprising:

loading a tag from a reconnecting target into said storage site identifier of said paged hardware I/O control block array pointer.

14. The method of claim 13 further comprising:

comparing a target address stored in said one hardware I/O control block with an address of said reconnecting target.

15. The method of claim 14 further comprising:

using said hardware I/O control block upon said target address and said address of said reconnecting target being equal.

16. A system comprising:

a parallel SCSI host adapter comprising:
   a sequencer; and
   a paged hardware I/O control block array pointer coupled to said sequencer; and a memory coupled to said paged hardware I/O control block array pointer, and including a paged hardware I/O control block array comprising:
   a plurality of pages going from a lowest page to a highest page, wherein each of said plurality of pages further comprises:
      a plurality of hardware I/O control block storage sites, wherein a number of said hardware I/O control block storage sites in said plurality of hardware I/O control block storage sites on at least one of said plurality of pages is equal to a number of unique tag values that can be returned by a tagged queue SCSI target reconnecting to said parallel SCSI host adapter.

17. The system of claim 16 wherein said memory is external to said parallel SCSI host adapter.

18. The system of claim 16 wherein said memory is internal to said parallel SCSI host adapter.

19. A memory comprising:

an expanded SCSI control block array for a parallel SCSI host adapter, said expanded SCSI control block array comprising:

a plurality of pages going from a lowest page to a highest page, wherein each page further comprises:
   a plurality of SCSI control block storage sites,
   wherein a number of SCSI control block storage sites in said plurality of SCSI control block storage sites on at least one of said plurality of pages is equal to a number of unique tag values that can be returned by a tagged queue SCSI target reconnecting to said parallel SCSI host adapter.

* * * * *